United States Patent [19]

Palotai

[11] 4,437,824
[45] Mar. 20, 1984

[54] APPARATUS FOR MAKING PARTICLEBOARD BY A CONTINUOUS EXTRUDING TECHNIQUE OF PARTICULATED MATERIALS

[75] Inventor: József Palotai, Budapest, Hungary

[73] Assignee: Chemokomplex Vegyipari Gepes Berendezes Export-Import Vallalat, Budapest, Hungary

[21] Appl. No.: 259,819

[22] Filed: May 4, 1981

[51] Int. Cl.$^3$ .............................................. B29J 5/00
[52] U.S. Cl. .............................. 425/131.1; 425/141; 425/145
[58] Field of Search ............... 425/78, 79, 131.1, 141, 425/145

[56] References Cited

U.S. PATENT DOCUMENTS

| | | | |
|---|---|---|---|
| 2,289,787 | 7/1942 | Kaschke et al. | 425/79 |
| 2,902,714 | 9/1959 | Johnson | 425/79 |
| 2,975,893 | 3/1961 | Johnson | 425/79 |
| 3,293,692 | 12/1966 | Rosenbaum | 425/79 |

Primary Examiner—James R. Hall
Attorney, Agent, or Firm—Anthony H. Handal

[57] ABSTRACT

The apparatus includes a multi-compartment hopper into each compartment of which various particulated materials are fed at a grain size according to the quality of the particular layer desired in the end product, which can be in the form of a board or a animal feed cakes in strip form, and wherein the materials are continuously but controllably fed into a pressing chamber onto which a forward pressing piston operates in one preferred direction, namely the direction of the feed, and a pair of side pressing pistons act from both sides, the interaction of all pressing means forcing the pressed product into a canal at the output of the pressing chamber where it may undergo further treatment such as by heating.

5 Claims, 4 Drawing Figures

APPARATUS FOR MAKING PARTICLEBOARD BY A CONTINUOUS EXTRUDING TECHNIQUE OF PARTICULATED MATERIALS

FIELD AND BACKGROUND OF THE INVENTION

The present invention relates to an apparatus for the continuous multilayer extrusion of particulated materials, which apparatus includes a hopper for receiving the material to be pressed or extruded, a pressing piston arranged for movement substantially in the central plane of the hopper and a pressing canal formed in the plane of the pressing piston.

Pressing or extruding apparatus of the above-described kind finds wide application in the manufacturing of furniture boards and boards used for a variety of other purposes. Such apparatus is described in Hungarian Pat. No. 162,851. The known boards for most applications must be provided, prior to their ultimate use, with additional layers which are usually secured by the application of adhesive materials on both sides. In the case of furniture boards, for example, the desired veneer layer becomes glued to the readily extruded boards. It is apparent that such manufacturing technology involving several steps, namely the pressing and the subsequent gluing, will make the manufacturing not only time consuming, but also expensive. The various steps require their particular equipment and manufacturing space.

SUMMARY OF THE INVENTION

It is, therefore, an object of the present invention to provide an apparatus for the continuous manufacturing of multilayer products from wood particles or lignocellulosic materials which eliminates the above-noted shortcomings of known apparatus.

Accordingly, the present invention provides an apparatus which requires that the various types of particulated materials used in the multilayer extrusion are placed into a multi-compartmented hopper according to the desired layering of the output product and from there it is fed in a parallel fashion from each compartment into a pressing or extrusion chamber where a pressing force is applied to it from two sides perpendicularly to the feed direction of the material and, in addition, a pressing force is also applied along the feed direction of the material.

The invention, therefore, provides an apparatus for the multilayer continuous pressing or extrusion of particulated materials which is provided with a hopper for receiving the particulate to be pressed and a forward pressing piston arranged for movement substantially along a central plane of the hopper (see plane x—x in FIG. 1) and, a pressing canal formed in the plane of the side pressing pistons. (see plane y—y in FIG. 1).

It is a salient feature of the present invention that the hopper is subdivided into several compartments in the plane of the forward pressing piston and, that the pressing chamber located between the forward pressing piston and the pressing canal is joined on each side by a side pressing piston having an operating stroke perpendicular to the direction of the stroke of the forward pressing piston.

The apparatus according to the present invention makes it possible to continuously manufacture multilayer products, like boards and sheets, from particulated material having multiple characteristics and, thereby assuring that for a particular layer the best suitable material is selected.

In addition and as another aspect of the present invention, the apparatus is also applicable to the production of animal feed, such as by pressing feed cakes in a multilayer fashion from a plurality of chaffed or particulated agricultural produce which are commonly used in feeding animals.

The invention also provides that the pressing surfaces of the piston herein be provided as desired or as need arises, with patterns, whereby the extruded output product will carry a decorative design on its surface.

The invention further provides, as another aspect thereof, that the front surfaces of the side pressing pistons carry cutting edges, whereby the apparatus performs the cutting up of the final product to desired size.

BRIEF DESCRIPTION OF THE DRAWINGS

The invention will become more readily apparent from the following description of the preferred embodiments thereof with reference to the accompanying drawings, in which.

DESCRIPTION OF THE PREFERRED METHOD AND EMBODIMENTS

Figure 1:
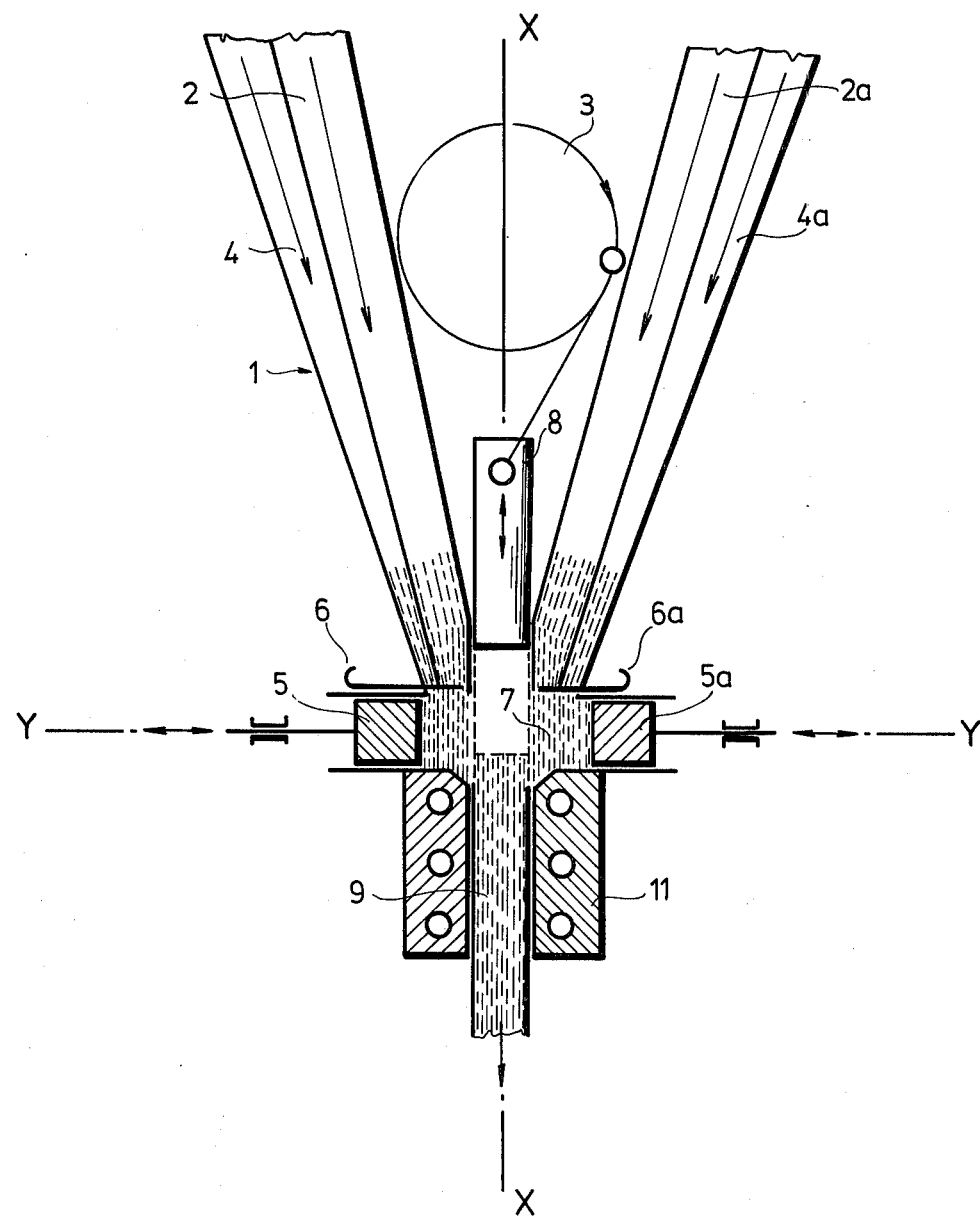
FIG. 1 is a schematical cross-sectional view of the apparatus according to the present invention.

The apparatus illustrated schematically in FIG. 1 is seen to include a hopper 1 for receiving the particulated materials to be pressed and in the central plane x—x of which a forward pressing piston 8 is arranged. The driving means 3 of the piston 8 is illustrated, for example, as a rotating mechanism and is shown only schematically. The hopper 1 itself is subdivided into several compartments 2, 2a, 4 and 4a which are filled individually with different particulated materials, such as lignocellulosic particulate, or particulated animal feed materials, according to the desired composition of the output product to be pressed, whether a board or feed cakes. Under hopper 1 there is formed a pressing chamber 7, in the plane y—y perpendicular to plane x—x, into which a pair of confronting side pressing pistons 5 and 5a are arranged to enter in a direction perpendicular to the direction of movement of forward pressing piston 8. Pistons 5 and 5a are driven similarly like piston 8 to reciprocate in the direction of the arrows, however, their drive is not shown in order to avoid crowding of the drawing. The pressing or extruding chamber 7 is continued in the form of a pressing canal 9 lying along the general direction of the stroke of forward pressing piston 8. In the illustrated embodiment, on both sides of the pressing canal 9 heater elements 11 are provided for purposes hereinafter described. At the bottom or output end of hopper 1 there are provided slider means 6 and 6a which are constructed to regulate the quantity of the materials to be fed from the individual compartments 2-4a. In the event the type of material used in the pressing or extruding process requires, the invention provides also for conveyor rollers in the individual compartments rotated about horizontal axles in order to aid the feed of the material within the compartments 2-4a toward the bottom or output end of the hopper.

For example, during the manufacturing of particleboard, compartments 2, 2a are fed with coarse shavings mixed with granular or powdered adhesive material and which mixture is fed into pressing chamber 7. The material fed from compartments 2 and 2a will form the internal so-called filler layer of the particleboard to be extruded or pressed. Through compartments 4 and 4a of the hopper 1 fine particulate in the form of chips or shavings mixed with adhesive material are fed or some other chipped material which one prefers for a particular cover layer on the end product. The forward feed of the material from compartments 4 and 4a is aided by the vacuum created by the return movement of the side pressing pistons 5, 5a.

The coarse shavings or chips coming from compartments 2, 2a and the fine chips fed from compartments 4, 4a, which border all along the sides of compartments 2, 2a, are pressed under the synchronized action of forward pressing piston 8 and side pressing pistons 5, 5a under appropriate pressure coming from three directions at continuous forward feed of the resulting multilayer material. As can be clearly seen from FIG. 1, the pressing of the sides is performed by the side pressing pistons 5, 5a from both directions, whereas the particulated material fed into the pressing chamber 7 is pressed from the top by forward pressing piston 8 during its forward stroke while entering the pressing chamber 7 and, at the same time, forces the pressed material into pressing canal 9, which is a continuation of chamber 7. Pressing canal 9 assures that the just-compressed layered or sandwiched material will be held together until it solidifies. The heating elements 11 arranged on both sides of canal 9, will heat the compressed material to the necessary temperature, which the particular materials used require to assure complete solidification and hardening of the end product. The pressing canal 9 will release a continuous particleboard which is solid in structure and meets the required characteristics of the end product. The details of the apparatus other than shown in FIG. 1, such as the actuating means for pistons 5, 5a and the synchronization of the strokes of piston 8 and pistons 5, 5a are believed to be apparent from the background referred to above and incorporated hereinto by reference and, also should be apparent for the expert in the field from the description hereinabove in conjunction with the background of the invention.

The apparatus illustrated in FIG. 1 is of the vertical type but a horizontal construction is also within the scope of the present invention. In the latter case, piston 8 moves in a horizontal plane, while pistons 5, 5a remain in the same plane. Piston 8 will enter chamber 7 from the side and the material compacted by pistons 5, 5a is forced by it into canal 9 which is lying also horizontally. The horizontal construction has some advantage in that the input openings of compartments 2, 2a, 4, 4a can be increased.

Figure 2:
FIG. 2 is a cross-sectional view of a multilayer chip board produced by the apparatus of FIG. 1.

From the cross-sectional showing of the particleboard of FIG. 2 one can easily see the structural relationship between the filler material 10 and the fine-grained cover layer 12. The cover layers 12 on the two sides of the filler material 10 can have different thickness according to the intended use of the board. The thickness of the cover layers 12 is controlled by the slider means 6, 6a. The thickness and width of the board are set by the dimensions of the pressing chamber 7 and pressing canal 9, which again should be apparent from the examination of the background material.

The particleboard on one or both sides can have different colors or stripes of varying colors. For this purpose, the compartments 4, 4a can be subdivided further by separating walls running crosswise (not shown in the drawings), and the subcompartments formed in this way are then fed with particulated materials of varying composition and/or color.

The apparatus according to the present invention can be used to manufacture boards having varying surface patterns or reliefs. To this effect the frontal surface of pistons 5, 5a are provided with the selected pattern.

Figure 4:
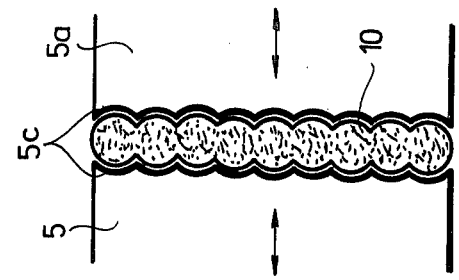
FIGS. 3 and 4 are schematical views of the pair of side pistons preferably used in pressing animal feed cakse.

The apparatus according to the present invention can be used not only for the manufacturing of particleboards but also for the continuous extrusion of products made from other comminuted materials. For example, the apparatus is useful in the making of feed cakes for animal use in continuous strips. To this effect pistons 5, 5a are provided with the recessed pattern running in the feed direction as seen in FIG. 4. In this case the pressed material will have a reduced cross section or becomes scored by the crests 5c of the recesses.

Figure 3:
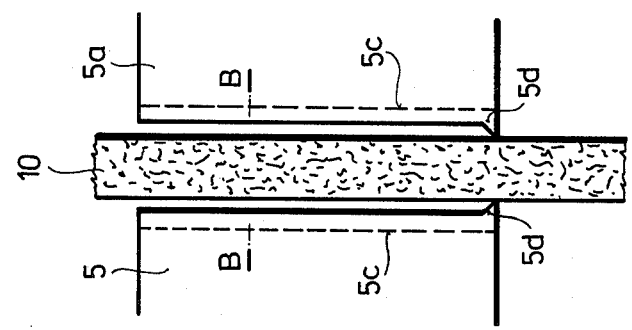

According to FIG. 3 the front surface of pistons 5, 5a can be provided with cutting edges 5d which, during the stepwise forward feed of the material at the forward end of the strokes of pistons 5, 5a, will enter the material without completely cutting it but scoring it for furture break-up along the reduced cross section.

The apparatus according to the present invention finds wide application in the construction industry for making door, space or insulating boards. The scope of the invention enables the apparatus to be used for making composite feed cakes for animals. From the above it should be clear that by end product is meant herein a particleboard or strip of a feed material for animal use.

The profile of the end product is determined by the dimension of the pressing chamber 7, which, in turn, is determined and bounded by the front surfaces of pistons 5, 5a. The pressing canal 9 is, therefore, dimensioned according to the cross-sectional area of the pressing chamber 7.

It is within the scope of the invention to add devices which cause vibration of the hopper 1 or of the walls of compartments 2–4a in order to aid the forward feed and uniform distribution of the material.

Thus, it can be seen that the apparatus of the present invention has a wide application in making multilayered particleboard materials which find use in a great variety of applications ranging from the construction industry to the animal feed industry.

I wish it to be understood that I do not desire to be limited to the exact details of construction shown and described herein, for obvious modifications will occur to a person skilled in the art.

Having thus described the invention, what I claim as new and desire to be secured by Letters Patent, is as follows:

1. Apparatus for the continuous manufacturing of a pressed multilayer product from particulated materials, comprising:

a multicompartmented hopper means for receiving said particulated materials, each compartment is adapted to be charged with a different material and having an input and an output end portions;

a pressing chamber located at the output end portions of said compartments;

a forward pressing piston means mounted for sliding into and out of said pressing chamber for compacting said particulated materials during such forward motion;

a pair of side pressing piston means having pressing surfaces and mounted for moving into and out of said pressing chamber from opposing directions, said opposing directions being perpendicular to the direction of motion of said forward pressing piston means wherein said side pressing piston means compact said particulated materials from said opposing directions;

an output canal means for receiving said compacted material and feeding same away from the region of said pressing chamber upon the action of said forward pressing piston means and of said pair of side pressing piston means, wherein said hopper means comprises at least a pair of compartments located on each side of said forward pressing piston means, and wherein heating means are provided along said output canal means.

2. The apparatus as claimed in claim 1, wherein feed control slider means are provided at said output end of said compartments for controlling the quantity fed from each compartment to said pressing chamber, thereby controlling the thickness of associated layers in said multilayer product.

3. The apparatus as claimed in claim 1, wherein said pressing surface of said side pressing piston means comprises a predetermined pattern.

4. The apparatus as claimed in claim 1, wherein said pressing surface of said side pressing piston means are provided with scoring or cutting edge means.

5. The apparatus as claimed in claim 1, comprising means for driving said forward pressing piston means and said side pressing piston means.

* * * * *